(12) United States Patent
Kurozuka et al.

(10) Patent No.: US 6,865,060 B2
(45) Date of Patent: Mar. 8, 2005

(54) DISK DRIVE DEVICE HAVING A LIFTING PLATE CONFIGURED TO LIFT A MAGNETIC HEAD SUPPORTING MEMBER

(75) Inventors: Akira Kurozuka, Osaka (JP); Eiichi Hanakawa, Kyoto (JP); Hitoshi Minabe, Osaka (JP); Tomio Yamamoto, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 100 days.

(21) Appl. No.: 10/128,811

(22) Filed: Apr. 23, 2002

(65) Prior Publication Data

US 2002/0159374 A1 Oct. 31, 2002

(30) Foreign Application Priority Data

Apr. 26, 2001 (JP) .................................... 2001-128873

(51) Int. Cl.[7] .............................................. G11B 5/54
(52) U.S. Cl. ................................ 360/255.2; 360/99.06
(58) Field of Search ......................... 360/99.06, 255.2, 360/254.3, 255.3, 255.4, 255.5

(56) References Cited

U.S. PATENT DOCUMENTS

| 4,636,896 | A | * | 1/1987 | Takikawa ................ 360/255.2 |
| 4,639,804 | A | * | 1/1987 | Moribe et al. ........... 360/255.2 |
| 4,742,409 | A | * | 5/1988 | Koyahara et al. ........ 360/255.2 |
| 4,839,757 | A | * | 6/1989 | Shigei et al. ............. 360/99.05 |
| 4,956,733 | A | * | 9/1990 | Dalziel .................... 360/255.2 |
| 5,471,439 | A | * | 11/1995 | Katayama et al. ....... 369/13.17 |
| 6,088,203 | A | * | 7/2000 | Nakamura et al. ....... 360/255.2 |
| 6,163,439 | A | * | 12/2000 | Jeong ...................... 360/254.3 |
| 6,212,045 | B1 | * | 4/2001 | Guzik ...................... 360/255.2 |
| 6,353,516 | B2 | * | 3/2002 | Nishimoto ............... 360/255.2 |

FOREIGN PATENT DOCUMENTS

| JP | 08-036800 | | 2/1996 |
| JP | 08-329546 | | 12/1996 |
| JP | 2001-101815 | * | 4/2001 |

* cited by examiner

Primary Examiner—Jefferson Evans
(74) Attorney, Agent, or Firm—Renner, Otto, Boisselle & Sklar, LLP

(57) ABSTRACT

A disc drive device for driving a disc accommodated in a cartridge comprises: a magnetic head; a magnetic head supporting member for supporting the magnetic head to contact the disc and to be separated from the disc; a lifting plate configured to lift the magnetic head supporting member; and moving means for moving the lifting plate in a direction parallel to a surface of the disc, in which the moving means moves the lifting plate in the parallel direction until the lifting plate abuts the magnetic head supporting member, and further moves the lifting plate in the parallel direction with the lifting plate abutting the magnetic head supporting member so that the lifting plate lifts the magnetic head supporting member up to separate the magnetic head from the disc.

6 Claims, 10 Drawing Sheets

DISK DRIVE DEVICE HAVING A LIFTING PLATE CONFIGURED TO LIFT A MAGNETIC HEAD SUPPORTING MEMBER

BACKGROUND OF THE INVENTION

1. Field of the Invention

The present invention relates to a disc drive device for recording and/or reproducing information to and/or from a disc-shaped recording medium, and more specifically, a magnetic head elevation control mechanism in a magneto-optical disc drive device.

2. Description of the Related Art

Conventionally, an information recording/reproduction device for recording and/or reproducing information using a recording medium, such as a magneto-optical disc, an optical disc, or the like, has been proposed. An example of recording media which have been proposed is a magneto-optical disc, or an optical disc accommodated in a cartridge. Conventional information recording/reproduction devices comprise an optical pickup and a magnetic head for writing and/or reading the information to and/or from the recording medium.

Such an information recording/reproduction device is widely used for an audio disc device, a video disc device, or an optical disc device which is used in a data storage device of a computer.

Among a number of optical disc devices, an MD (minidisc) device which uses a small-diameter disc for its media is widely used as a small audio disc device which is suitable for being easily carried by a user. Furthermore, as well as audio video (AV) equipment such as an MD device, personal computers have been rapidly becoming small and portable. Therefore, there is a demand for a much smaller and thinner optical disc device to be mounted to such equipment or a computer.

For use of a small-sized disc, an improvement in a recording density is essential in order to obtain a capacity sufficient for recording a large-data size image or a moving picture. In recent years, technologies for improving the recording density of the optical disc have advanced rapidly. Specifically, for a magneto-optical disc, various high-resolution reproduction schemes have been developed, and allow a high recording density which cannot be achieved by a conventional method.

In a drive device for a magneto-optical disc, a magnetic head which is used for recording the information is held at a tip of a leaf-spring-shape supporting member. The magnetic head is positioned so as to face a recording region of the disc via an opening which is provided in a cartridge. The magnetic head is coupled to an optical pickup by a coupling member. The optical pickup and the magnetic head are provided so as to interpose a disc therebetween. The magnetic head can be integrally movable with the optical pickup in a radial direction of the disc. For recording the information, the magnetic head is pressed toward the disc by the supporting member so as to be close to a disc surface or to be in contact with a disc surface. Thus, the magnetic head can apply a predetermined magnetic field to the disc from an opposite side to a spot of laser light directed by the optical pickup.

For reproducing the information, the magneto-optical disc drive device reads the information using the optical pickup, and therefore does not require the magnetic head. Usually, the optical disc drive device comprises a magnetic head elevation control mechanism. The magnetic head elevation control mechanism moves the magnetic head close to the disc for recording information, and for separating and retracting the magnetic head from the disc surface for reproducing information to prevent abrasion or damage of the disc surface or the magnetic head.

Hereinafter, such a conventional magneto-optical disc drive device will be described with reference to the drawings.

FIG. 9 is a perspective view illustrating a cartridge to be used in a conventional disc drive device.

In FIG. 9, a cartridge 31 stores a disc 32 in a manner which enables the disc to rotate relative to the cartridge 31. Also, the cartridge 31 has an opening 33 which allows an optical pickup and a magnetic head to face a recording surface of the disc 32. When the cartridge 31 is mounted to the disc drive device, a shutter 34 is moved so as to expose the opening 33. When the cartridge 31 is removed from the disc drive device, the shutter 34 moves back to its original position so as to cover the opening 33.

FIG. 10 is a plan view illustrating a structure of a conventional disc drive device 50. FIG. 11 is a cross-sectional view illustrating the conventional disc drive device 50 taken along line A—A of FIG. 10.

For further understanding, FIGS. 14A through 14C each show a schematical cross-sectional view of the conventional disc drive device 50. Now, with reference to FIGS. 14A through 14C, an operation of the conventional disc drive device 50 to contact/separate the magnetic head with/from the disc will be described.

FIG. 14A shows the conventional disc drive device 50 without the disc cartridge 31 being inserted therein. In FIG. 14B, a magnetic head 40 contacts the disc 32. In FIG. 14C, the magnetic head 40 is apart from the disc 32. When the disc cartridge 31 is inserted into the disc drive device 50, each component of the disc drive device 50 is positioned as illustrated in FIG. 14B, allowing recording of information to the disc. Specifically, the magnetic head 40 which is attached to a tip of a suspension 41 contact the disc 32, while a lifting plate 46 is out of contact with the suspension 41. For reproducing information, the magnetic head 40 is not required, and therefore the lifting plate 46 pivots to lift the suspension 41. As a result, as shown in FIG. 14C, the magnetic head 40 is apart from the disc 32.

As shown in FIG. 14B, the conventional disc drive device 50 requires an entire height of h1 for allowing the lifting plate 46 to pivot. Therefore, the thickness of the device 50 increases.

Next, with reference to FIGS. 10 through 13, the conventional disc drive device 50 will be described in more detail.

As shown in FIGS. 10 and 11, the cartridge 31 storing the disc 32 is held by a holder 39 in a position in which information can be recorded/reproduced. The holder 39 is attached to a chassis 35 by pivot axes 60 to be pivotably elevated. The pivot axes 60 are provided at two corners of the chassis 35 opposite to an insertion side for a cartridge. In the chassis 35, a guide shaft 38 is provided. Along the guide shaft 38, an optical pickup 37 is movable by a driving motor (not shown) in a radial direction of the disc 32. The optical pickup 37 faces the disc 32 via the opening 33 on a bottom surface of the cartridge 31. Further, a spindle (not shown) is provided in a center of the chassis 35, and rotates the disc 32 accommodated in the cartridge 31.

A magnetic head 40 is attached to a tip of a suspension 41, and coupled to the optical pickup 37 by an angled member 43. The magnetic head 40, the suspension 41, the optical pickup 37, and the angled member 43 are integrally movable in the radial direction of the disc 32. A magnetic head base 42 is held on an upper portion of the angled member 43 in parallel to a recording surface of the disc 32, and is pressed in the direction of the disc 32 by a leaf-spring 57.

In this state, the suspension 41 bends upward from its natural state, and locates the magnetic head 40 so as to contact and press the disc 32. Thus, the magnetic head 40 glides on the disc 32 with a predetermined downward thrust (i.e., toward the disc surface). A magnetic field is applied to the disc from an opposite side to a spot of laser light directed by the optical pickup 37 to record the information.

A positional variation of the magnetic head 40 and variation in angles between the magnetic head 40 and the recording surface of the disc 32 caused by wobbling of the disc 32 is absorbed by the deformation of a gimbal suspension 53 at the tip of the suspension 41. The thrust of the magnetic head 40 which presses the disc 32 is set to be small in order to avoid excessive bending of the disc 32. Accordingly, the gimbal suspension 53 has very low rigidity, and is flexible.

The suspension 41 must be configured such that the magnetic head 40 contacts the disc 32 via the opening 33 of the cartridge 31. The suspension 41 is bent to avoid contact with objects provided between an attached portion of the suspension 41 to the angled member 43 and the recording surface of the disc 32.

Under the cartridge 31, a drive mechanism (not shown) is provided. An engaging portion 45 extends from a side surface of the holder 39 to a bottom surface of the cartridge 31. The sliding plate 44 is driven so as to slide in a direction of cartridge insertion.

Furthermore, a lifting plate 46 is pivotably provided on the upper surface of the holder 39. When the sliding plate 44 slides in a direction represented by arrow b (direction b) toward the pivot axes 60, an inclined protrusion 48 of the sliding plate 44 lifts up a protrusion 47 of the lifting plate 46. Thus, the lifting plate 46 inclines such that an edge 46a thereof is lifted. By the inclination of the lifting plate 46, the magnetic head suspension 41 which is positioned above the lifting plate 46 is lifted up irrespective of the position where the magnetic head suspension 41 locates the magnetic head 40 from the inner to the outer periphery of the disc 32. Therefore, the magnetic head 40 is brought into a state in which the magnetic head 40 is apart from the disc 32 (hereinafter, referred to as a lifted-up state).

Usually, in a disc drive device, a magnetic head contacts a disc only during recording, and the magnetic head is lifted up during reproduction in order to prevent abrasion or damage of the disc surface or the magnetic head.

FIG. 12 is a plan view illustrating the conventional disc drive device 50 with the magnetic head in the lifted-up state. FIG. 13 is a cross-sectional view illustrating the conventional disc drive device 50 with the magnetic head in the lifted-up state taken along line A—A of FIG. 12.

In FIGS. 12 and 13, the sliding plate 44 is slid in the direction b toward the pivot axes 60 by a drive mechanism provided under the holder 39. The inclined protrusion 48 of the sliding plate 44 goes under the protrusion 47 of the lifting plate 46, and thus the lifting plate 46 is pivotably elevated. Therefore, the magnetic head suspension 41 is deformed upward and lifted. At the same time, the tip of the magnetic head suspension 41 contacts the bottom surface of the magnetic head base 42. The gimbal suspension 53 of the magnetic head suspension 41 is deformed downward. The magnetic head 40 and the magnetic head suspension 41 are accommodated between the upper surface of the cartridge 31 and the magnetic head base 42.

The tip of the magnetic head suspension 41 is made to contact the magnetic head base 42 for the following reasons. One reason is to prevent an entire thickness of the device 50 from being increased because the tip of the magnetic head suspension 41 protrudes above the height of the magnetic head base 42. Another reason is to prevent the magnetic head suspension 41 from being deformed due to shock or an external force which the magnetic head may experience if dropped when in the lifted-up state.

The above conventional disc drive device 50 and the like has the following problems.

As shown in FIG. 13, a thickness of the device 50 (which is indicated by "D") is determined by the sum of the thicknesses of the chassis 35, the cartridge 31, and the magnetic head elevation control mechanism which is located above the cartridge 31. To lift the magnetic head 40 so as to contact the magnetic head base 42 which is located above the cartridge 31, a lift amount L of the lifting plate 46 must be at least a distance H shown in FIG. 13 between the upper surface of the cartridge and the disc surface. If the lift amount L is smaller than this required amount, the magnetic head 40 cannot be sufficiently brought apart from the disc 32, and the magnetic head 40 may collide with the disc 32 during reproduction due to vibration or applied shock. Further, if the magnetic head 40 cannot contact the magnetic head base 42, the gimbal suspension 53 may be deformed due to shock caused by dropping, or the like. Therefore, the lift amount L should be sufficiently large, and thus the entire thickness of the device 50 cannot be made thin.

As described above, when the drive mechanism for controlling an elevation operation of the magnetic head 40 is provided above the cartridge 31, the thickness of the device 50 significantly increases. Even if the drive mechanism is provided under the cartridge 31, the thickness of the device 50 may be increased by the thickness of the drive mechanism. Therefore, even though the spindle and optical pickup are thin, it is difficult to make the entire thickness of the device 50 thin. Moreover, in this case, driving force must be transported from the drive mechanism under the cartridge 31 to the lifting plate 46 which is located above the cartridge 31. Therefore, the structure of the device 50 is complicated.

SUMMARY OF THE INVENTION

According to one aspect of the invention, there is provided a disc drive device for driving a disc accommodated in a cartridge, comprising: a magnetic head; a magnetic head supporting member for supporting the magnetic head to contact the disc and to be separated from the disc; a lifting plate configured to lift the magnetic head supporting member; and moving means for moving the lifting plate in a direction parallel to a surface of the disc, in which the moving means moves the lifting plate in the parallel direction until the lifting plate abuts the magnetic head supporting member, and further moves the lifting plate in the parallel direction with the lifting plate abutting the magnetic head supporting member so that the lifting plate lifts the magnetic head supporting member up to separate the magnetic head from the disc.

In one embodiment of the invention, a disc drive device further comprises a sliding plate on which the lifting plate is provided, and in which the moving means moves the lifting plate by sliding the sliding plate.

In one embodiment of the invention, a disc drive device further comprises a holder for holding the cartridge, and a linking member including two end portions with one end portion pivotably attached to a chassis of the disc drive device, and a contact portion for contacting the lifting plate provided at the other end portion, in which:

the holder is pivotably attached to the chassis, the lifting plate is pivotably attached to the sliding plate, and when the holder is pivotably elevated from the chassis to eject the cartridge from the disc device, the contact portion of the linking member contacts the lifting plate to pivotably elevate the lifting plate from the sliding plate, and the lifting plate further lifts the magnetic head support member up so as to further separate the magnetic head from the disc.

In one embodiment of the invention, an inclined protrusion is provided on an path in which the sliding plate slides, and the moving means slides the sliding plate to ride on the inclined protrusion, and thus the lifting plate on the sliding plate further lifts up the magnetic head supporting member.

In one embodiment of the invention, a disc drive device further comprises a holder for holding the cartridge, in which the cartridge has a curved region which has a contour of an arc substantially concentric with the disc accommodated in the cartridge, and the moving means is placed in a space defined by an inner wall of the holder and the curved region of the cartridge when the cartridge is mounted to the holder.

In one embodiment of the invention, the holder is attached to the chassis of the disc device at two pivot axes to be pivotably elevated, at least one of the axes being provided at an inward position from the corners of the holder, and the disc drive device further comprises deformation preventing means between the cartridge and the holder, which absorbs a shock to the holder from the cartridge when the cartridge is mounted to the holder.

Thus, the invention described herein makes possible the advantages of providing a small and thin disc drive device which ensures a reliable elevation operation of the magnetic head with a simple structure.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

Figure 15A:
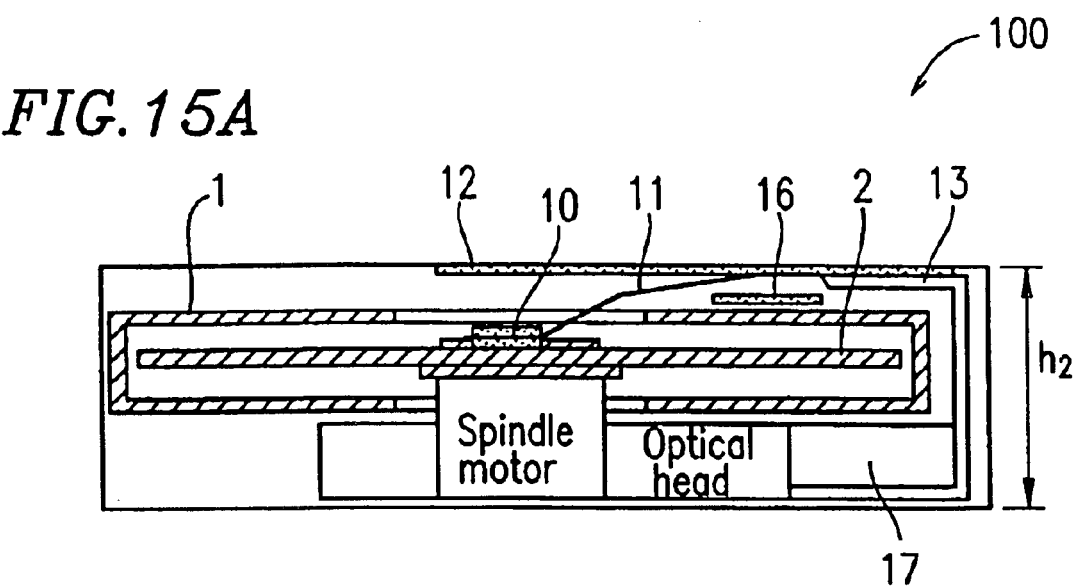
FIGS. 15A and 15B are schematical cross-sectional views illustrating a disc drive device according to the present invention.
Figure 15B:
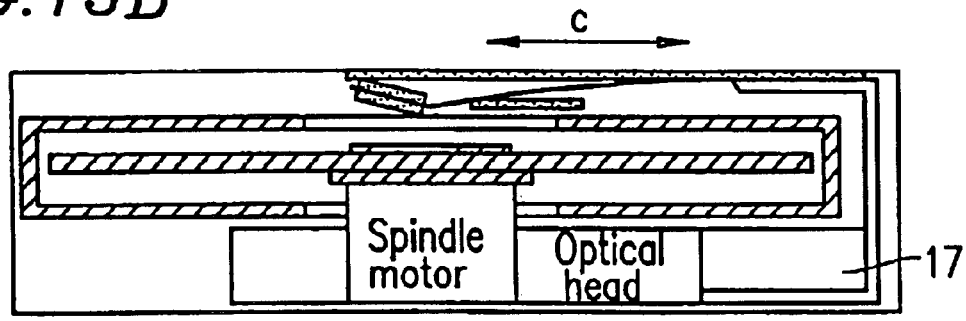

FIGS. 15A and 15B are schematical cross-sectional views illustrating a disc drive device 100 according to the present invention.

Now, with reference to FIGS. 15A and 15B, an operation of the disc drive device 100 to contact/separate a magnetic head with/from a disc will be described.

A disc drive device 100 according to the present invention comprises a magnetic head 10, a suspension 11 which is a magnetic head supporting member for supporting the magnetic head 10 to contact the disc 2 and to be separated from the disc 2, a lifting plate 16 configured to lift the suspension 11, and a drive mechanism 17 which is moving means for moving the lifting plate in a direction parallel to a surface of the disc 2.

FIG. 15A shows the device 100 in a state in which information can be recorded on the disc 2. In FIG. 15A, the magnetic head 10 attached to a tip of the suspension 11 contact the disc 2. For reproducing information from the disc 2, the magnetic head 10 is not required. The drive mechanism 17 moves the lifting plate 16 in a direction represented by arrow c (direction c) until the lifting plate 16 abuts the suspension 11. Then, the drive mechanism 17 further moves the lifting plate 16 in the direction c with the lifting plate 16 in contact with the suspension 11. As a result, the lifting plate 16 lifts the suspension 11 up, and thus, as shown in FIG. 15B, the magnetic head 10 is apart from the disc 2.

Figure 14A:
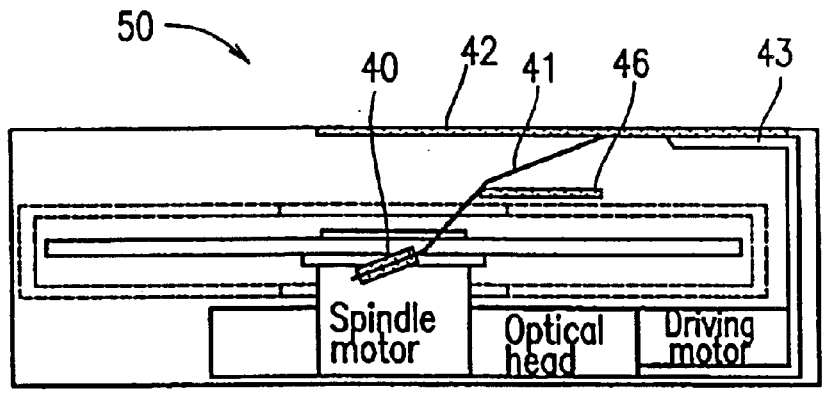
FIGS. 14A through 14C are schematical cross-sectional views illustrating the conventional disc drive device.
Figure 14B:
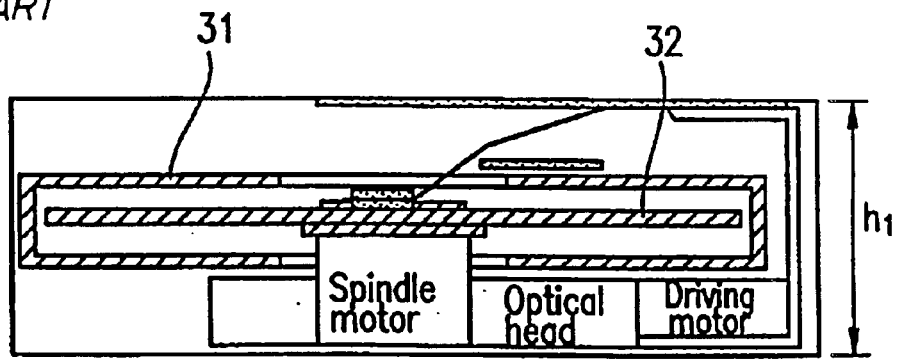
Figure 14C:
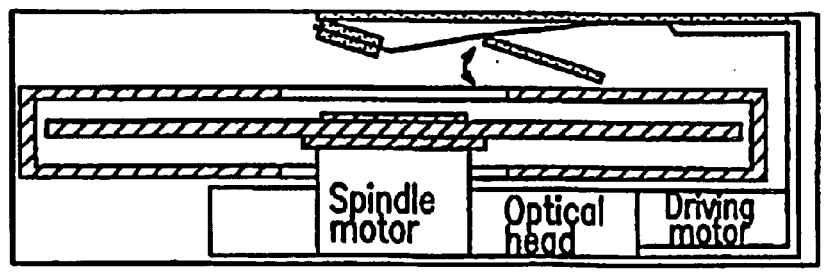

In the disc drive device 100 according to the present invention, the lifting plate 16 is moved in the direction c for contacting/separating the magnetic head 10 with/from the disc 2. As shown in FIG. 15A, the entire height required for the device 100 is h2 (where h2 h1; h1 being the entire height of the conventional device as shown in FIG. 14B). Therefore, a thickness of the disc drive device 100 according to the present invention can be smaller than that of the conventional disc drive device 50 shown in FIGS. 14A through 14C.

Next, with reference to FIGS. 1 through 8, the disc drive device 100 according to the present invention will be described in more detail.

Figure 1:
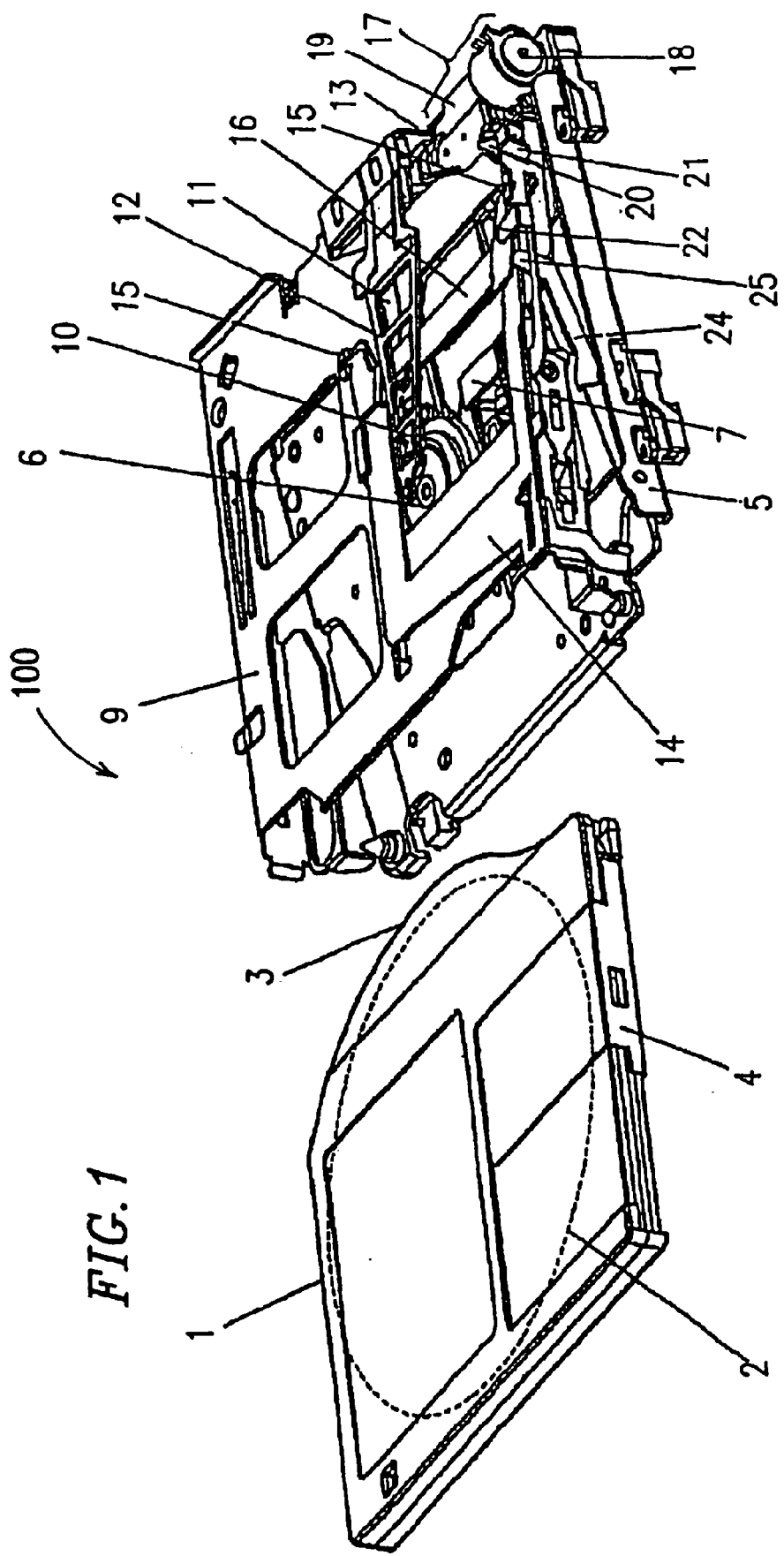
FIG. 1 is a perspective view illustrating a disc drive device according to the present invention.

FIG. 1 is a perspective view illustrating the disc drive device 100 according to the present invention. In FIG. 1, the cartridge 1 used with the disc drive device 100 is also shown.

The cartridge 1 accommodates the disc 2 in a manner which enables the disc 2 to be rotatably driven with respect to the cartridge 1. Also, the cartridge 1 has an opening which allows an optical pickup 7 and a magnetic head 10 of the disc drive device 100 to face a recording surface of the disc 2. When the cartridge 1 is mounted to the disc drive device 100, a shutter 4 is moved so as to expose the opening. When the cartridge 1 is removed from the disc drive device 100, the shutter 4 moves back to its original position so as to cover the opening.

A spindle motor 6 is fixed to a center portion of a chassis 5. The spindle motor 6 rotatably drives the disc 2 accommodated in the cartridge 1. The optical pickup 7 is held along a guide shaft 8 (see FIG. 4) fixed to the chassis 5 so as to be moved from the inner to the outer periphery of the disc 2 for writing and/or reading information to and/or from the disc 2.

The holder 9 may be pivotably attached to the chassis 5. In this case, the pivot axes of the holder 9 are provided at two corners of the chassis 5 opposite to an insertion side for a cartridge. The holder 9 may be configured to be pivotably elevated.

The cartridge 1 may have an edge 3 having a curved region (as shown in FIG. 1) which has a contour of an arc substantially concentric with the disc 2 accommodated in the cartridge 1. In this case, the drive mechanism 17 may be placed in a space defined by an inner wall of the holder 9 and the curved region of the cartridge 1 when the cartridge 1 is mounted to the holder 9.

Figure 2:
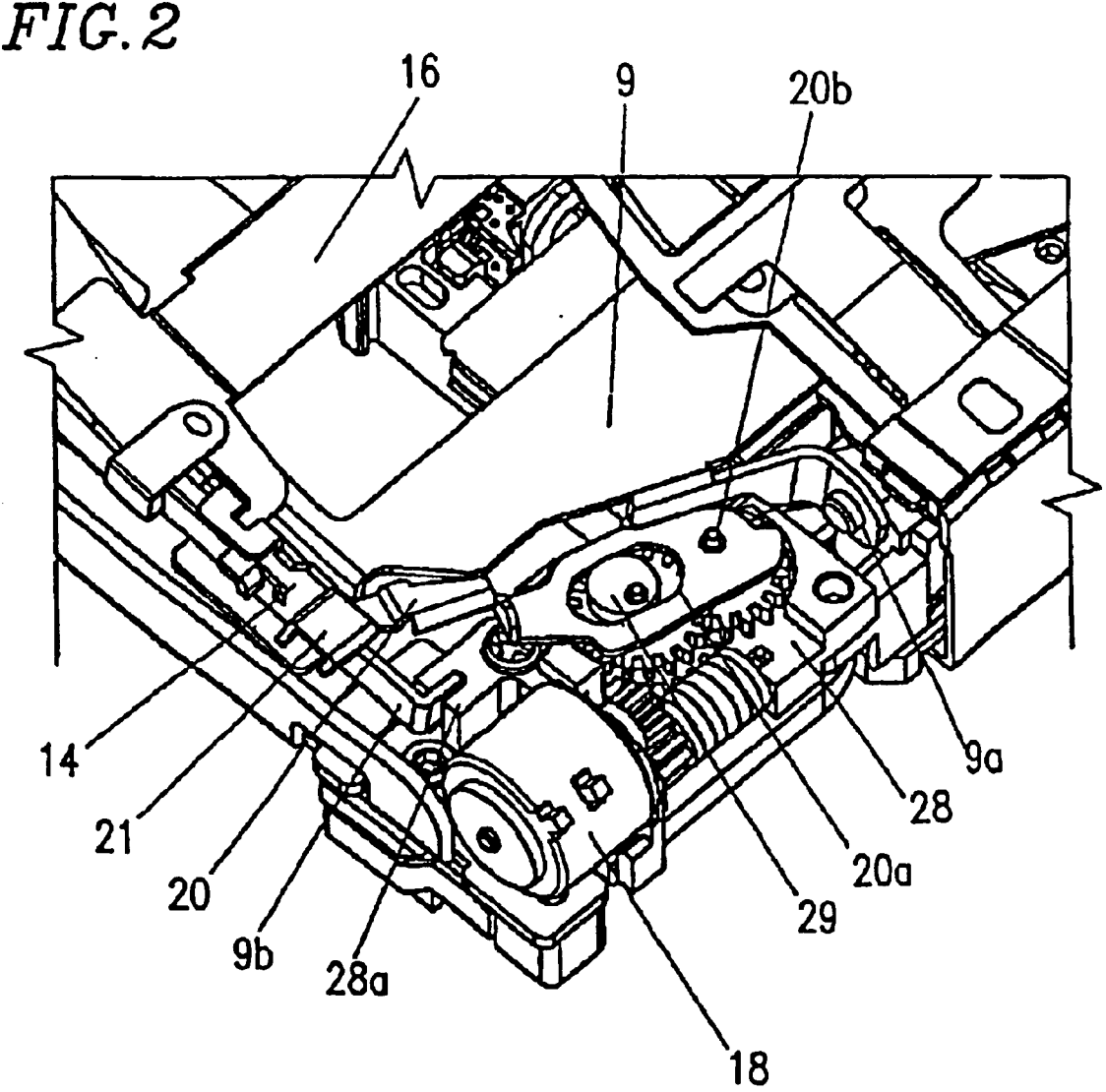
FIG. 2 is a partial perspective view illustrating a structure of a drive mechanism according to the present invention.

FIG. 2 is a partial perspective view illustrating a structure of the drive mechanism 17 according to the present invention. In FIG. 2, the drive mechanism 17 is illustrated without a cover to clearly show the inner structure of the drive mechanism 17.

The holder 9 is pivotably attached to the chassis 5 of the disc drive device 100 by two pivot axes. At least one of the pivot axes is provided at an inward position from the corners of the holder 9. In FIG. 2, one of the pivot axes of the holder 9 is formed at an inward position from a corner of the holder 9 such that a rear protrusion 9a of the holder 9 engages an axis of the chassis 5.

After the cartridge 1 is mounted, when the holder 9 is pivotably descended, the disc 2 is brought to a state in which information can be recorded/reproduced to/from the disc 2. Similar to the conventional example, the magnetic head 10 is provided at a tip of the suspension 11 and coupled to the optical pickup 7 via the suspension 11 by an angled member 13. The magnetic head base 12 is pressed toward the disc 2 by a leaf spring 27 so as to be supported in parallel to the disc 2. Further, the magnetic head base 12 according to the present invention is attached to a position lower than that of the conventional example.

To the holder 9, a sliding plate 14 may be attached so as to slide in a direction parallel to the direction of the cartridge insertion (or the recording surface of the disc 2). In this case, a pair of bearing portions 15 are provided on the sliding plate 14. The lifting plate 16 may be pivotably attached thereto. The sliding plate 14 slides in the direction parallel to the direction of cartridge insertion (or the recording surface of the disc 2) by the drive mechanism 17 (see FIG. 1) located in a corner of the cartridge 1. The drive mechanism 17 comprises an elevation control motor 18, a speed reduction mechanism 19, and a drive arm 20.

In FIG. 2, a rotation speed of the elevation control motor 18 is reduced by a series of gears. A cam 29 is provided at the last stage of the series of the gears. The cam 29 engages cam grooves 20a of the drive arm 20. A tip of the drive arm 20 engages an engaging hook 21 of the sliding plate 14. Therefore, when the elevation control motor 18 is rotated in one direction, the drive arm 20 pivots back and forth about a pivot axis 20b, and thus the sliding plate 14 slides back and forth with the lifting plate 16 provided thereon.

Moreover, a base 28 of the speed reduction mechanism 19 is fixed to the chassis 5. A protrusion 28a having a slit is provided on the base 28. Further, a protrusion 9b which is formed on the side of the holder 9 opposite to the insertion side for a cartridge engages the slit of the protrusion 28a. With such a structure, when the cartridge 1 is inserted into or removed from the holder 9, the force applied to the holder 9 from the cartridge 1 is conveyed to the protrusion 28a. Then, the force applied to the protrusion 28a from the holder 9 is conveyed to the chassis 5 via the base 28. Thus, the protrusion 9b serves as deformation preventing means which is provided between the cartridge 1 and the holder 9, and absorbs the shock caused by the cartridge 1 being inserted into or removed from the holder 9. In the case where the force applied to the holder 9 from the cartridge 1 when the cartridge 1 is pulled is small, the protrusion 9b may only abut the side of the cartridge 1 opposite to the insertion side thereof.

When the optical pickup 7 advances to the outermost periphery of the disc 2 along with the magnetic head 10, the angled member 13 reaches a side of the elevation control motor 18. Therefore, the speed reduction mechanism 19 goes under the angled member 13.

The lifting plate 16 is pressed by a rebound leaf 22 (FIG. 1) so as to eliminate wobbling. The lifting plate 16 is located just under the suspension 11 and in a position where the lifting plate 16 is out of abutment with the suspension 11 when the sliding plate 14 moves to the position closest to the pivot axes of the holder 9. At this time, the magnetic head 10 contacts the disc 2. In FIG. 1, the sliding plate 14 is located in the most distant position from the pivot axes of the holder 9. In this state, the lifting plate 16 pushes the suspension 11 up. The magnetic head 10 is retracted into a space above the cartridge 1 to a position apart from the surface of the disc 2.

On a side of the holder 9, a holder link 24 (FIG. 1) may be provided. The holder link 24 is a linking member having two end portions. One end portion of the holder link 24 is pivotably attached to the chassis 5 of the disc drive device 100. In the other end portion, a contact portion which contacts the lifting plate 16 is provided. Herein, the holder 9 is pivotably attached to the chassis 5, while the lifting plate 16 is pivotably attached to the sliding plate 14.

When the holder 9 is pivotably elevated from the chassis 5 to eject the cartridge 1, a contact portion 25 of the holder link 24 (FIG. 1) contacts the lifting plate 16, and the lifting plate 16 is pivotably elevated from the sliding plate 14. The lifting plate 16 further lifts the suspension 11 up to further separate the magnetic head 10 from the disc 2.

Figure 3:
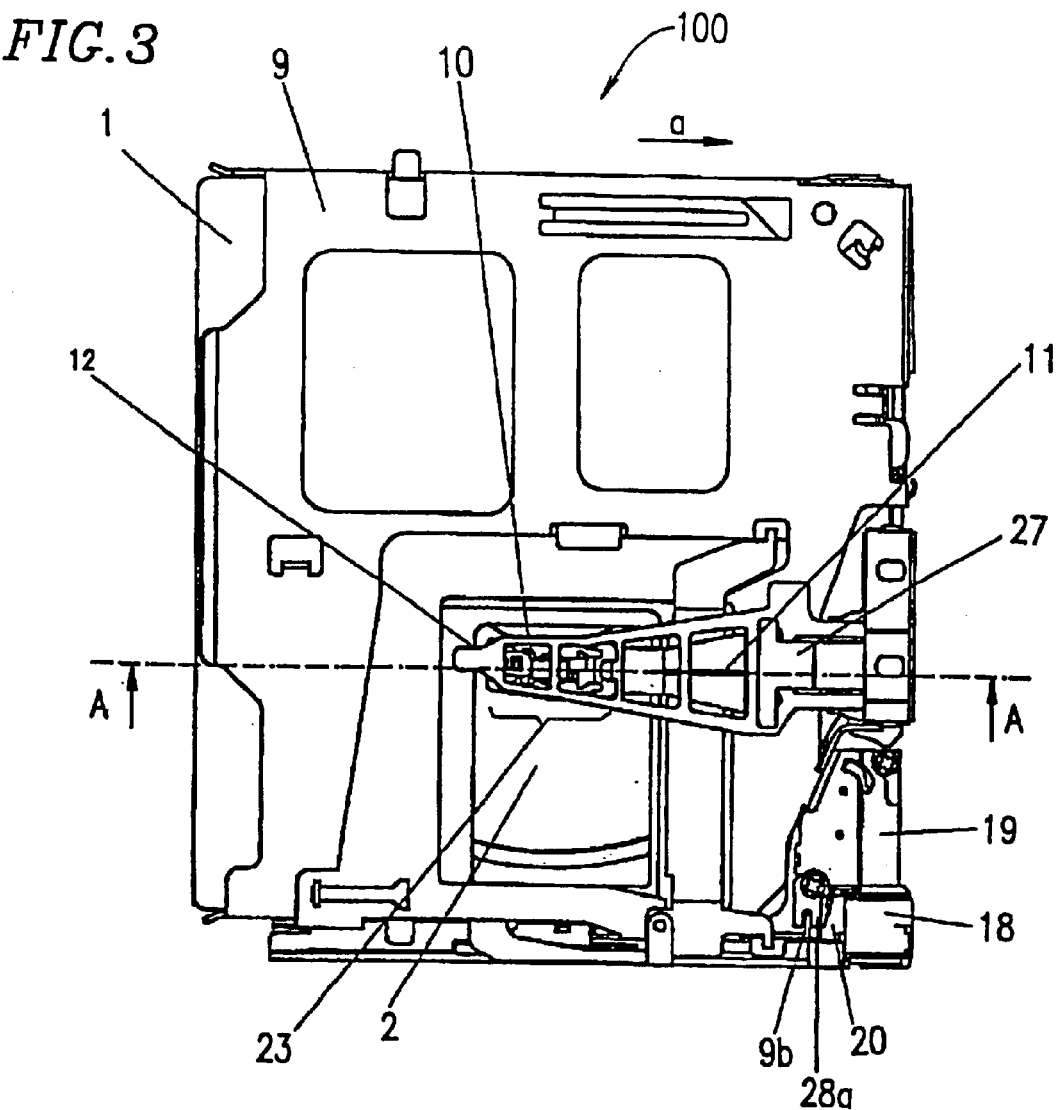
FIG. 3 is a plan view illustrating the disc drive device according to the present invention with a magnetic head in a descended state.
Figure 4:
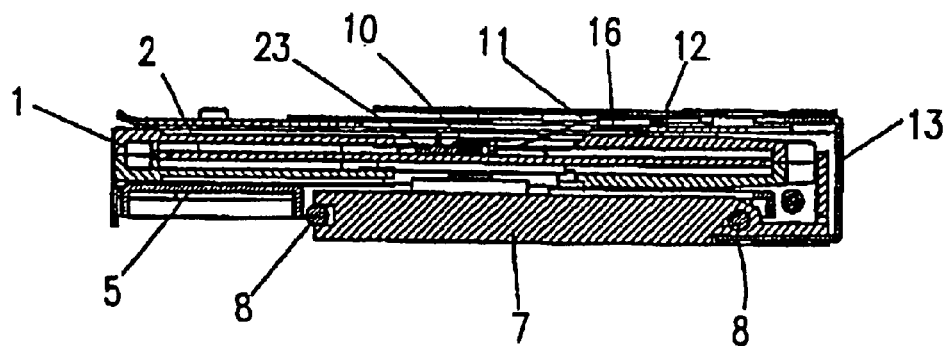
FIG. 4 is a cross-sectional view of the disc drive device according to the present invention taken along line A—A of FIG. 3.

FIG. 3 is a plan view illustrating the disc drive device 100 according to the present invention with the magnetic head 10 in a descended state. FIG. 4 is a cross-sectional view of the disc drive device 100 taken along line A—A of FIG. 3.

When the cartridge 1 is mounted and the sliding plate 14 is movable in a direction represented by arrow a toward the pivot axes 60 by the elevation control motor 18, the lifting plate 16 is retracted to the position where the lifting plate 16 is out of abutment with the suspension 11, while the magnetic head 10 is descended to the recording surface of the disc 2. The magnetic head base 12 is provided at a height which secures a minimum space for preventing the lifting plate 16 from abutting the suspension 11. This height is smaller than that of the conventional example. Thus, the thickness of the device 100 can be decreased according to the present invention.

Figure 5:
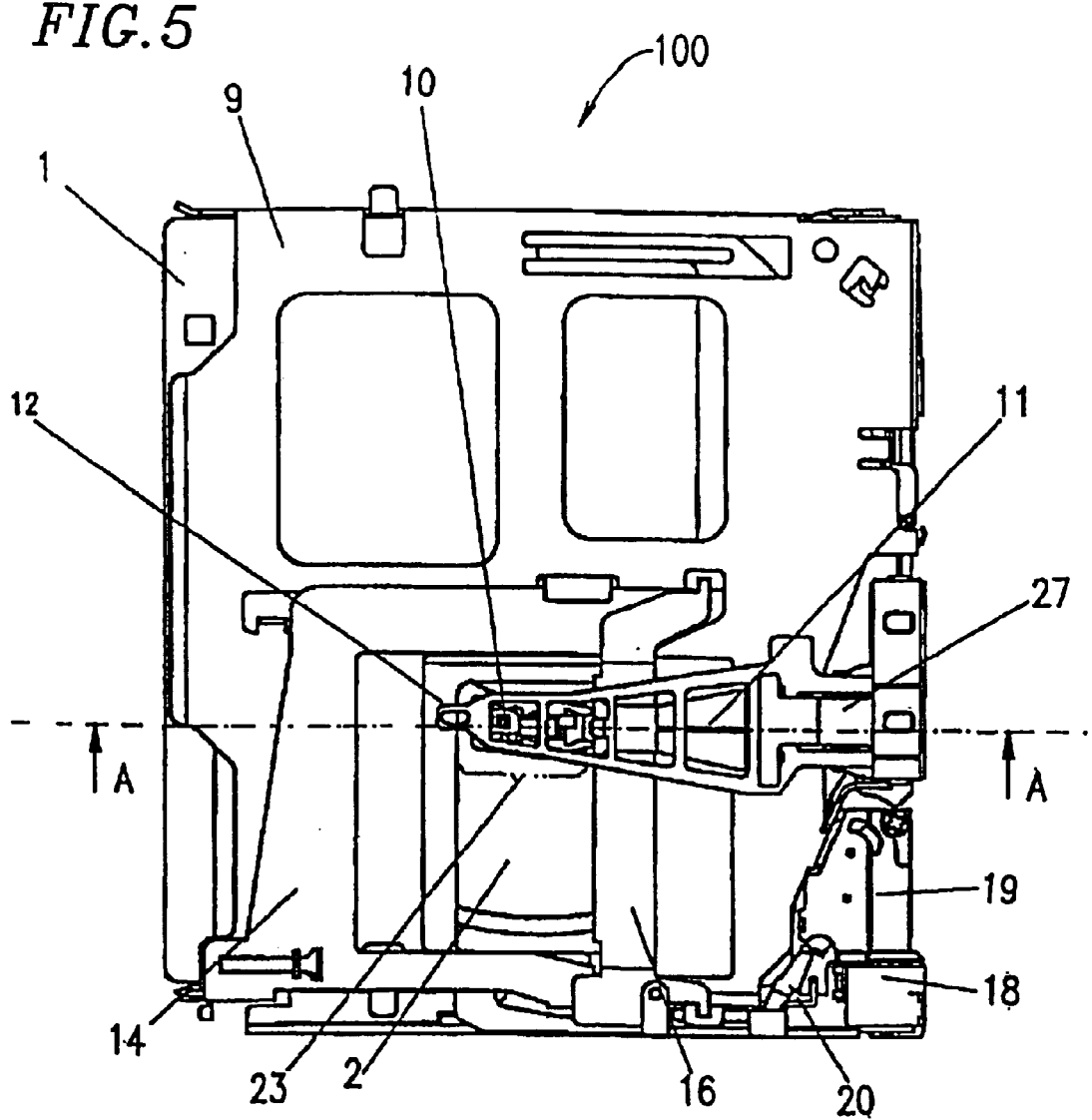
FIG. 5 is a plan view illustrating the disc drive device according to the present invention with the magnetic head in the lifted-up state.
Figure 6:
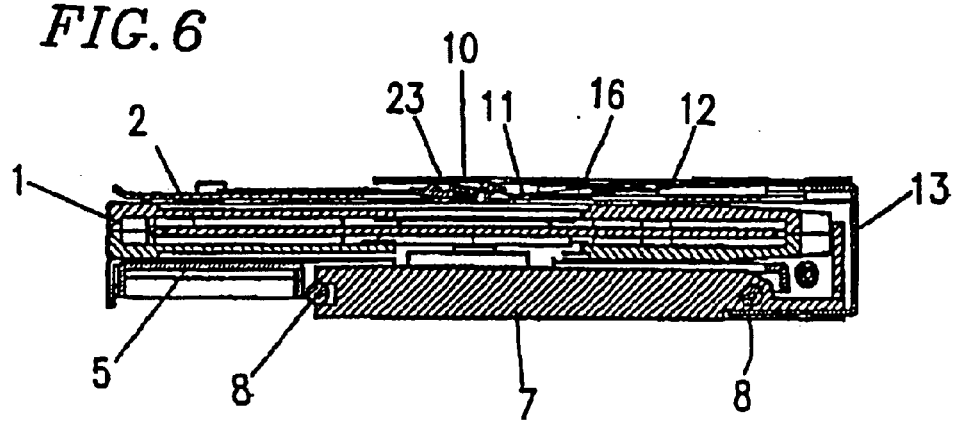
FIG. 6 is a cross-sectional view of the disc drive device according to the present invention taken along line A—A of FIG. 5.

FIG. 5 is a plan view illustrating the disc drive device 100 according to the present invention with the magnetic head 10 in the lifted-up state. FIG. 6 is a cross-sectional view of the disc drive device 100 taken along line A—A of FIG. 5.

When the sliding plate 14 is moved to the position closest to an opening through which the cartridge 1 is inserted by the elevation control motor 18, the lifting plate 16 advances, abuts the suspension 11, and lifts the magnetic head 10 up. The magnetic head 10 is supported by the lifting plate 16 in the proximity of the gimbal suspension 23. A tip of the magnetic head 10 contacts the magnetic head base 12.

The suspension 11 is bent in a space between the lifting plate 16 and the magnetic head base 12, and is retracted into the space above the cartridge 1. Since the magnetic head base 12 is provided at a low position relative to the disc 2 (i.e., in the close proximity of the disc 2), a thickness required for the space above the cartridge 1 can be reduced. At this time, a part of the magnetic head 10 may be in the opening of the cartridge 1. The edge of the magnetic head 10 is pressed to the magnetic head base 12 and supported by the lifting plate 16 in the proximity of the tip of the suspension 11. Therefore, the magnetic head 10 is resistant to an exterior shock, and collision of the magnetic head 10 to the disc 2 or deformation of the suspension 11 during the magnetic head 10 being lifted can be avoided.

Figure 7:
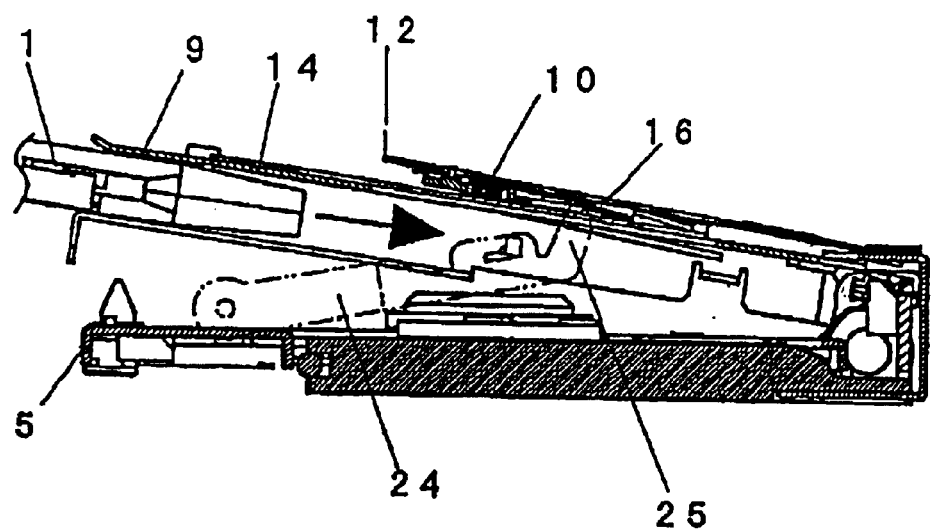
FIG. 7 is a cross-sectional view illustrating the disc drive device according to the present invention with a holder being pivotably elevated.

FIG. 7 is a cross-sectional view illustrating the disc drive device 100 according to the present invention with the holder 9 being pivotably elevated.

The disc drive device 100 comprises the holder 9 for holding the cartridge 1 and the holder link 24 which has two end portions. One end portion of the holder link 24 is pivotably attached to the chassis 5 of the disc drive device 100. At the other end portion, a contact portion which contacts the lifting plate 16 is provided. Herein, the holder 9 is pivotably attached to the chassis 5, while the lifting plate 16 is pivotably attached to the sliding plate 14.

When the holder 9 is pivotably elevated from the chassis 5 to eject the cartridge 1, the contact portion 25 of the holder link 24 contacts the lifting plate 16, and the lifting plate 16 is pivotably elevated from the sliding plate 14. The lifting plate 16 further lifts the suspension 11 up to further separate the magnetic head 10 from the disc 2.

For removing or exchanging cartridges 1, the holder 9 pivots about the pivot axis provided on the side of the chassis 5 opposite to the insertion side for a cartridge.

The sliding plate 14 is slid toward the insertion side of the holder 9, and the lifting plate 16 lifts the suspension 11 up to bring the magnetic head 10 into the lifted-up state. When the holder 9 pivots, the holder link 24 rises in cooperation with the elevation of the holder 9. The contact portion 25 of the holder link 24 contacts the lifting plate 16. Then, the contact portion 25 urges the lifting plate 16 to further lift the lifting plate 16 up. Thus, even when the magnetic head 10 is in the position where a part thereof may go into the opening of the cartridge 1 while the magnetic head 10 is being lifted up, for exchanging cartridges, the magnetic head 10 can be further lifted up and entirely retracted into the space above the cartridge 1 so as to prevent contact between the cartridge 1 and the magnetic head 10.

Figure 8:
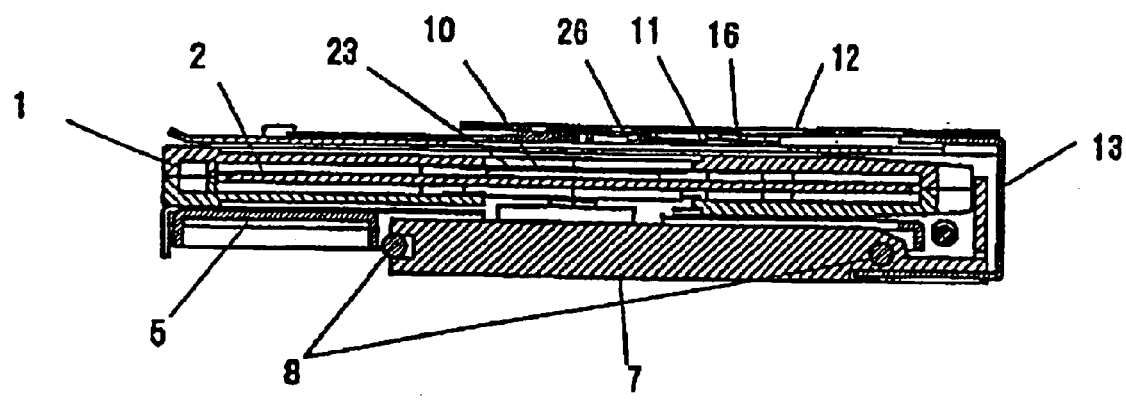
FIG. 8 is a cross-sectional view illustrating another example of a disc drive device according to the present invention.
Figure 9:
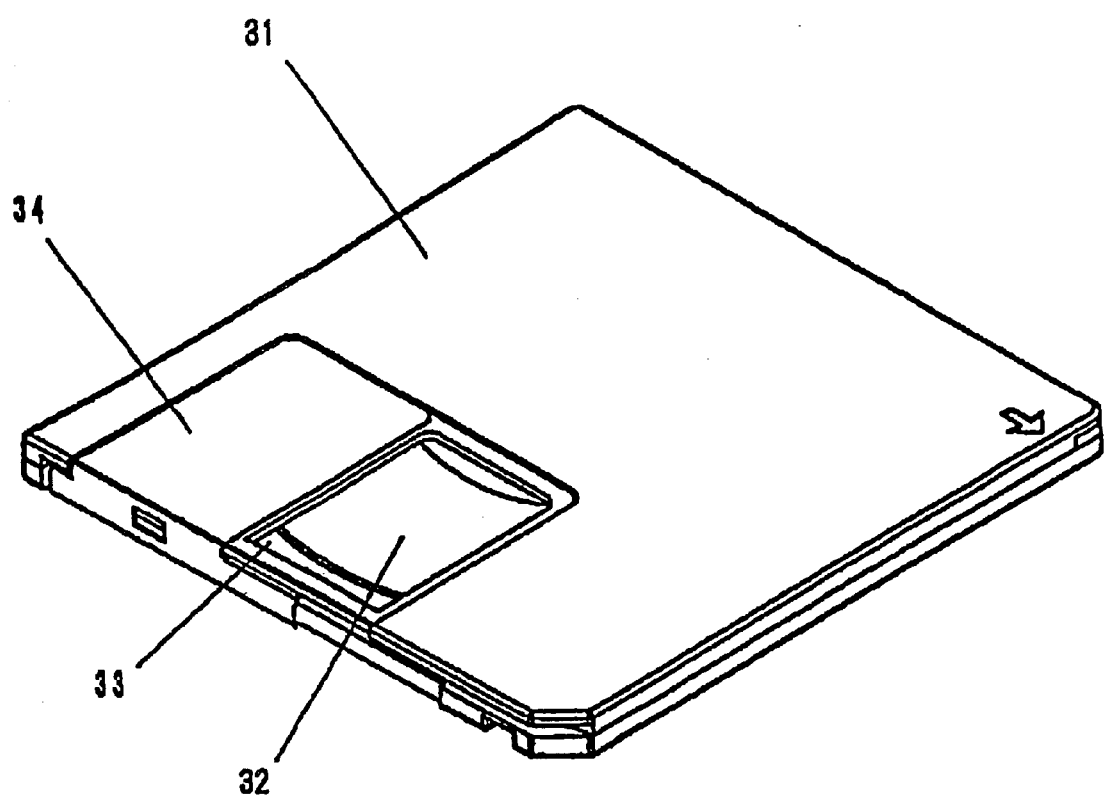
FIG. 9 is a perspective view illustrating a cartridge to be used in a conventional disc drive device.
Figure 10:
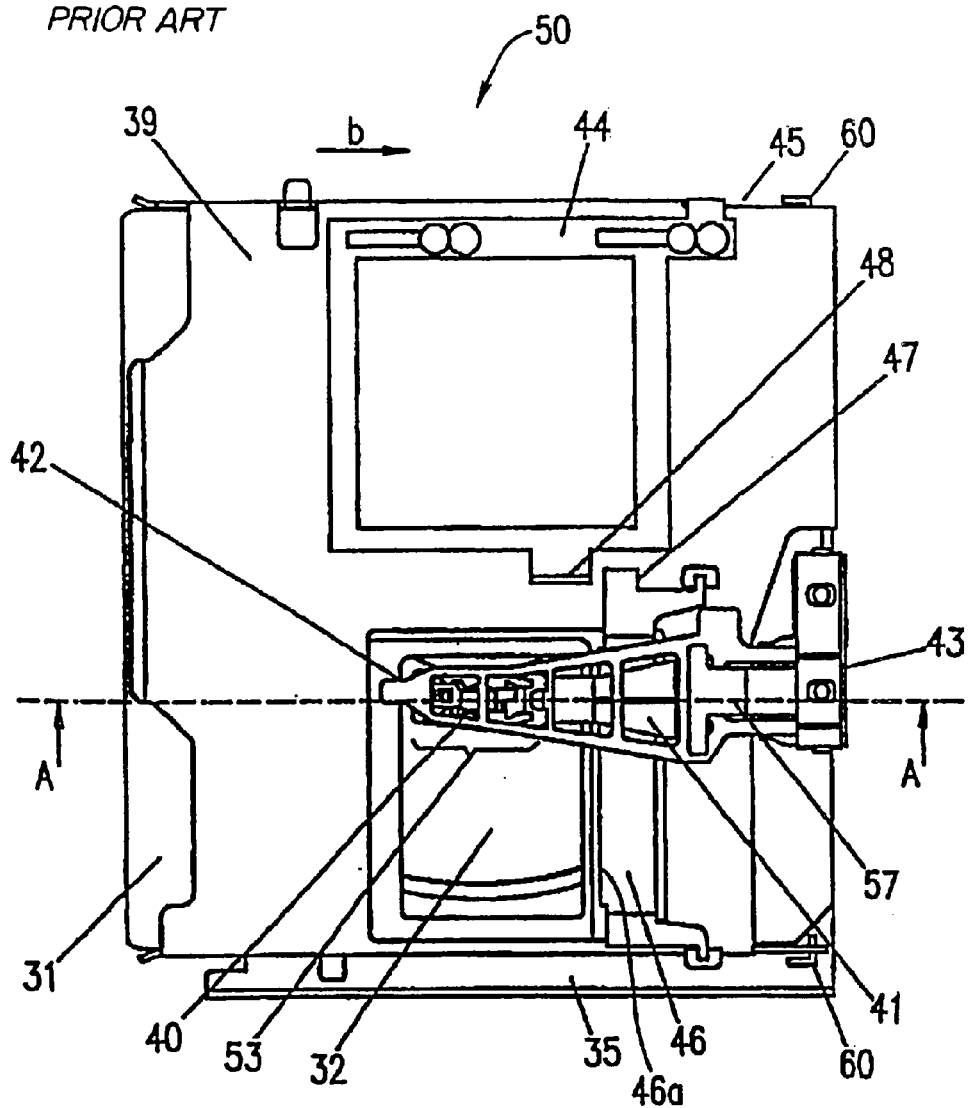
FIG. 10 is a plan view illustrating a structure of a conventional disc drive device.
Figure 11:
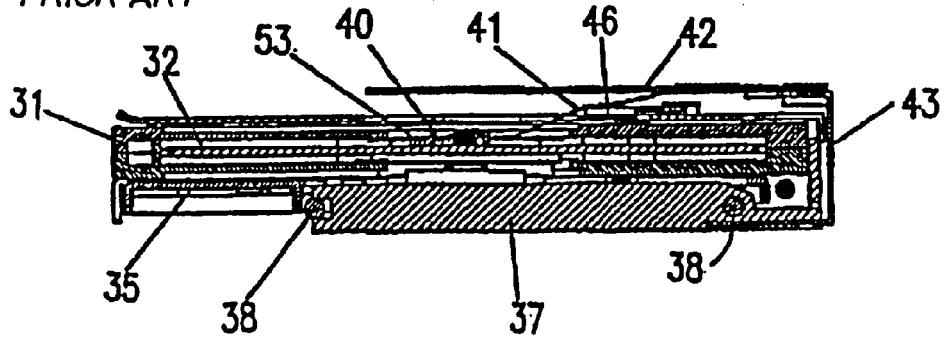
FIG. 11 is a cross-sectional view illustrating the conventional disc drive device taken along line A—A of FIG. 10.
Figure 12:
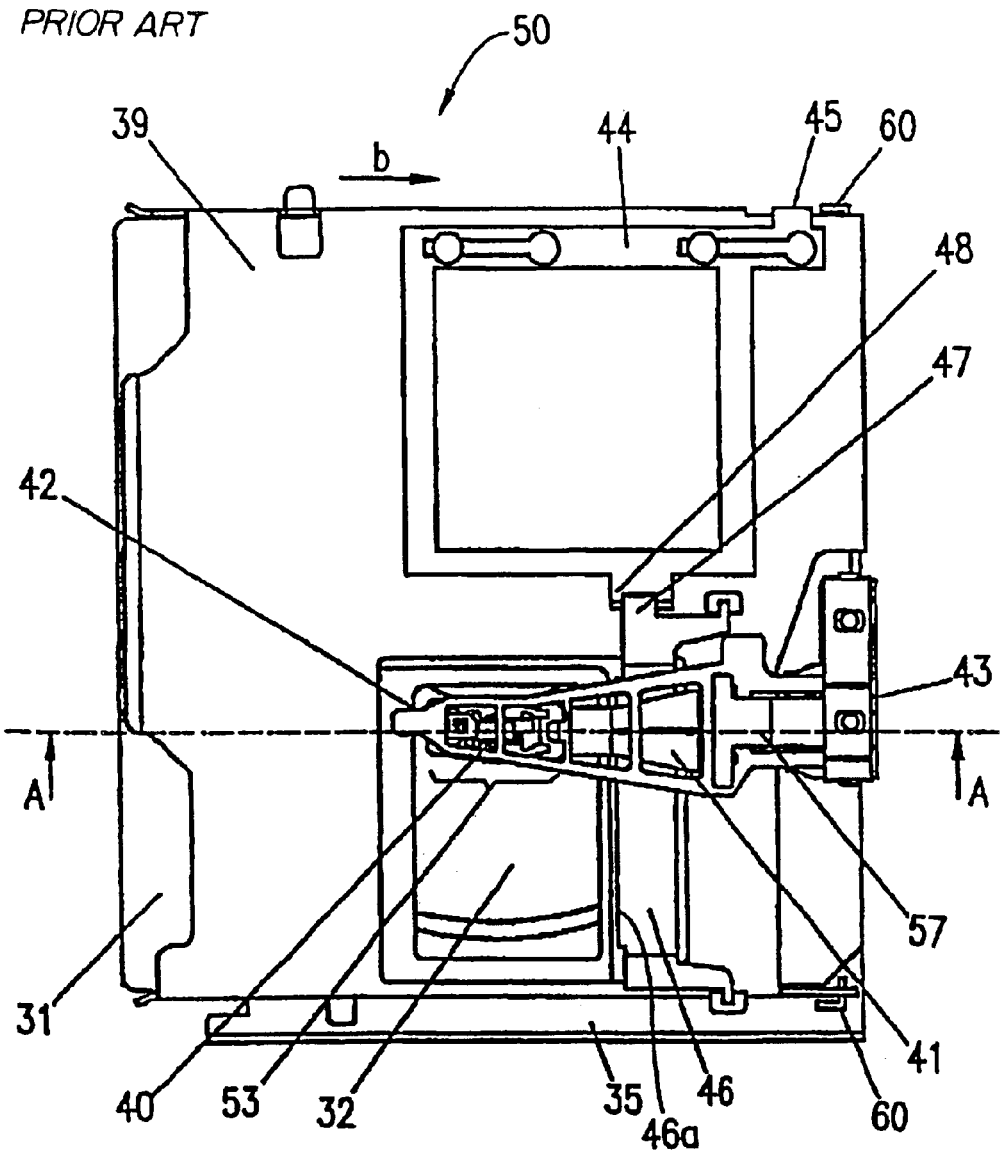
FIG. 12 is a plan view illustrating the conventional disc drive device with a magnetic head in a lifted-up state.
Figure 13:
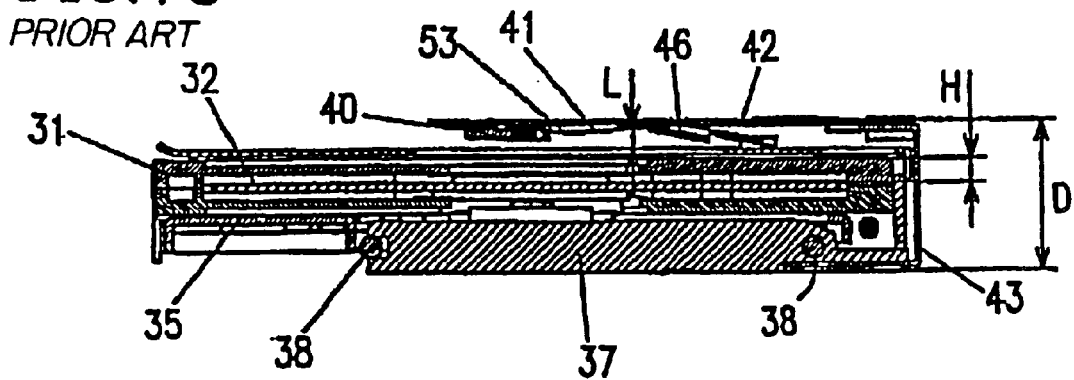
FIG. 13 is a cross-sectional view illustrating the conventional disc drive device taken along line A—A of FIG. 12.

FIG. 8 is a cross-sectional view illustrating another example of the disc drive device according to the present invention.

In this example, an inclined protrusion 26 is provided on a path in which a sliding plate 14 slides. A drive mechanism 17 is configured such that the sliding plate 14 is slid to ride on the inclined protrusion 26, and thus a lifting plate 16 on the sliding plate 14 further lifts up a suspension 11.

Thus, the magnetic head 10 may be entirely retracted into a space above the cartridge 1 when being lifted up. Therefore, this example of the disc drive device according to the present invention can be applied to a reproduction-only disc which does not have an opening in an upper surface of the cartridge, such as an MD (minidisc).

According to one aspect of the present invention, contacting/separating a magnetic head mounted to a magnetic head supporting member is performed by a lifting plate to lift up or not to lift up the magnetic head supporting member. Therefore, a thickness required for a space above the cartridge can be decreased, and thus an entire thickness of a disc drive device can be decreased.

According to another aspect of the present invention, when cartridges are exchanged, an exchanging operation can be smoothly performed without a magnetic head in contact with the cartridges even when the magnetic head is not entirely retracted into a space above the cartridge. Therefore, a thickness required for a space above the cartridge can be decreased, and thus an entire thickness of a disc drive device can be decreased.

The present invention may also be applied to a reproduction-only disc which does not have an opening in an upper surface of the cartridge.

According to another aspect of the present invention, a space for a drive motor is not required to be provided on, under, or around a drive mechanism. Therefore, the device can be small and thin.

According to still another aspect of the present invention, at least one of pivot axes of a holder is provided at an inward position from the corners of the holder. Therefore, a drive motor for a magnetic head elevation control means can be provided in a corner of the holder.

According to yet another aspect of the present invention, a force received by a holder when exchanging cartridges is received by a member fixed to a chassis. Therefore, there is no possibility that the holder is deformed due to an external force even when pivot axes are not located on the edges of the holder.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disc drive device for driving a disc accommodated in a cartridge, comprising:
   a magnetic head;
   a magnetic head supporting member for supporting the magnetic head to contact the disc and to be separated from the disc, the magnetic head supporting member extending in a first direction from one end attached to a chassis of the disc drive device to another end supporting the magnetic head;
   a lifting plate configured to lift the magnetic head supporting member; and
   moving means for moving the lifting plate in a direction parallel to a surface of the disc and parallel to the first direction,
   wherein the moving means moves the lifting plate in the parallel direction until the lifting plate abuts the magnetic head supporting member, and further moves the lifting plate in the parallel direction with the lifting plate abutting the magnetic head supporting member so that the lifting plate lifts the magnetic head supporting member up to separate the magnetic head from the disc.

2. A disc drive device for driving a disc accommodated in a cartridge, comprising:

a magnetic head;

a magnetic head supporting member for supporting the magnetic head to contact the disc and to be separated from the disc;

a lifting plate configured to lift the magnetic head supporting member; and moving means for moving the lifting plate in a direction parallel to a surface of the disc; and a sliding plate on which the lifting plate is provided, wherein the moving means moves the lifting plate by sliding the sliding plate, and the moving means moves the lifting plate in the parallel direction until the lifting plate abuts the magnetic head supporting member, and further moves the lifting plate in the parallel direction with the lifting plate abutting the magnetic head supporting member so that the lifting plate lifts the magnetic head supporting member up to separate the magnetic head from the disc.

3. A disc drive device according to claim 2, further comprising:

a holder for holding the cartridge; and a linking member including two end portions with one end portion pivotably attached to a chassis of the disc drive device, and a contact portion for contacting the lifting plate provided at the other end portion, wherein:

the holder is pivotably attached to the chassis, the lifting plate is pivotably attached to the sliding plate, and when the holder is pivotably elevated from the chassis to eject the cartridge from the disc device, the contact portion of the linking member contacts the lifting plate to pivotably elevate the lifting plate from the sliding plate, and the lifting plate further lifts the magnetic head support member up so as to further separate the magnetic head from the disc.

4. A disc drive device according to claim 2, wherein an inclined protrusion is provided on a path in which the sliding plate slides, and the moving means slides the sliding plate to ride on the inclined protrusion, and thus the lifting plate on the sliding plate further lifts up the magnetic head supporting member.

5. A disc drive device according to claim 2, further comprising a holder for holding the cartridge, wherein the cartridge has a curved region which has a contour of an arc substantially concentric with the disc accommodated in the cartridge, and the moving means is placed in a space defined by an inner wall of the holder and the curved region of the cartridge when the cartridge is mounted to the holder.

6. A disc drive device according to claim 5, wherein the holder is attached to the chassis of the disc device at two pivot axes to be pivotably elevated, at least one of the axes being provided at an inward position from the corners of the holder, and the disc drive device further comprises deformation preventing means between the cartridge and the holder, which absorbs a shock to the holder from the cartridge when the cartridge is mounted to the holder.

* * * * *